United States Patent
Yamazaki et al.

(10) Patent No.: US 8,605,559 B2
(45) Date of Patent: Dec. 10, 2013

(54) OPTICAL PICKUP DEVICE AND OPTICAL DISC APPARATUS

(75) Inventors: Kazuyoshi Yamazaki, Yamato (JP); Daisuke Tomita, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/078,030

(22) Filed: Apr. 1, 2011

(65) Prior Publication Data

US 2011/0299375 A1 Dec. 8, 2011

(30) Foreign Application Priority Data

Jun. 7, 2010 (JP) .................................. 2010-129530

(51) Int. Cl.

| | |
|---|---|
| G11B 5/55 | (2006.01) |
| G11B 7/00 | (2006.01) |
| G11B 7/135 | (2012.01) |
| G11B 20/18 | (2006.01) |
| G11B 7/125 | (2012.01) |
| G11B 11/00 | (2006.01) |

(52) U.S. Cl.
USPC .............. 369/53.28; 369/112.03; 369/109.01; 369/109.02; 369/110.03; 369/112.07; 369/112.12; 369/124.12; 369/44.41; 369/53.22; 369/53.27; 369/53.35

(58) Field of Classification Search
USPC ............... 369/53.28, 112.03, 109.01, 109.02, 369/110.03, 112.07, 112.12, 124.12, 44.41, 369/53.22, 53.27, 53.35
See application file for complete search history.

(56) References Cited

U.S. PATENT DOCUMENTS

| | | | |
|---|---|---|---|
| 2005/0199778 A1 | 9/2005 | Kadowaki et al. | |
| 2008/0093569 A1* | 4/2008 | Kamisada et al. | ............ 250/552 |
| 2008/0247298 A1 | 10/2008 | Ogata | |
| 2009/0185471 A1* | 7/2009 | Yamazaki | ................ 369/109.01 |
| 2010/0061202 A1* | 3/2010 | Yamazaki et al. | ......... 369/44.23 |

FOREIGN PATENT DOCUMENTS

| | | |
|---|---|---|
| JP | 2004-281026 | 10/2004 |
| JP | 2006-344344 | 12/2006 |
| JP | 2009-170060 | 7/2009 |

OTHER PUBLICATIONS

Kousei Sano et al., Novel One-beam Tracking Detection Method for Dual-Layer Blu-ray Discs, IEICE Technical Report, CPM2005-149(Oct. 2005), pp. 31-34.

* cited by examiner

Primary Examiner — Aneeta Yodichkas
(74) Attorney, Agent, or Firm — Antonelli, Terry, Stout & Kraus, LLP.

(57) ABSTRACT

In a small-sized optical pickup device for enabling to obtain a stable servo-signal, as well as, a focus error signal and a tracking error signal, without receiving ill influences of stray lights from other layers, when recording/reproducing a multi-layer optical disc, a reflection light from the multi-layer optical disc is divided into plural numbers of regions by a diffraction grating. And, it is divided into at least four (4) regions, by a division line in the tangential direction of the optical disc and a division line in the radial direction thereof. Light receiving parts, for detecting either one of grating diffraction lights, i.e., a $+1^{st}$ dimensional grating diffraction light or a $-1^{st}$ dimensional grating diffraction light of a light beam entering into the at least four (4) regions, are aligned, nearly, on a straight line in the radial direction of the optical disc, and light receiving parts for detecting the other dimensional grating diffraction light are aligned, shifting, with respect to a direction nearly coincident with a tangential direction of the optical disc.

9 Claims, 9 Drawing Sheets

RECORDING/REPRODUCING L0

FIG. 10B

RECORDING/REPRODUCING L1

OPTICAL PICKUP DEVICE AND OPTICAL DISC APPARATUS

This application relates to and claims priority from Japanese Patent Application No. 2010-129530 filed on Jun. 7, 2010, the entire disclosure of which is incorporated hereby by reference.

BACKGROUND OF THE INVENTION

The present invention relates to an optical pickup device and also an optical disc apparatus.

As the background art of a field of the present technology is already known Japanese Patent Laying-Open No. 2006-344344 (Patent Document 1). In this Patent Document 1 is described, as the problem to be dissolved, "Obtaining a desired signal from an optical disc having plural numbers of recording layers, at high accuracy", and as the means for dissolving, there is described, "A light flux of P-polarization emitting from a light source unit 51 is reflected on a optical disc 15, and enters into a lens 61 while becoming the S-polarization light. And, on quarter wave plates 62 and 63, each is given with an optical phase difference of +¼ wavelength to the light flux entering into +X side of an optical axis, and is given with an optical phase difference of −¼ wavelength to the light flux entering into −X side thereof. With this, a signal light passing through the quarter wave plate 64 comes into the S-polarization, while a stray light comes into the P-polarization, and on a polarization optical element 64, only the signal light can pass therethrough."

Also, for example, in Non-Patent Document 1 is described, as the problem to be dissolve, "When recording/reproducing a dual layer disc, in particular, if a light reflecting from a layer differing from a target layer enters into a photo detector, as a stray light from other layer(s), an offset is generated on a TE signal. For this reason, with the conventional structure without a countermeasure for the stray light from other layer (s), the offset of the TE signal on the dual layer disc comes to be large, comparing to that in the case of a single layer, and therefore a stable control is prevented", and as the dissolving means, there is described, "The photo detector for use of tracking is disposed in a region where no stray light enters." The structures of that are described is also described in Japanese Patent Laying-Open No. 2004-281026 (Patent Document 2).

PRIOR ART DOCUMENTS

Patent Documents

[Patent Document 1] Japanese Patent Laying-Open No. 2006-344344 (page 26, FIG. 3 and FIG. 5);
[Patent Document 2] Japanese Patent Laying-Open No. 2004-281026 (page 71, FIG. 22, FIG. 24 and FIG. 25); and
[Patent Document 3] Japanese Patent Laying-Open No. 2009-170060.

Non-Patent Documents

[Non-Patent Document 1] Electronic Information Communication Academic Society Bulletin CPM 2005-149 (2005-10) (page 33, FIG. 4 and FIG. 5).

BRIEF SUMMARY OF THE INVENTION

In the optical pickup device, in general, for the purpose of irradiating a spot, correctly, on a predetermined recording track within an optical disc, an objective lens is shifted into a focus direction with detection of a focus error signal, and in addition thereto, the objective lens is shifted into a disc radius direction (a Rad direction) with detecting a tracking error signal, i.e., executing a tracking adjustment. With those signals, position control of the objective lens is conducted.

Among of the servo-signals mentioned above, in relation to the tracking error signal, there is a big problem when applying onto a multi-layer disc, which is constructed with two (2) or more of recording layers. On the multi-layer disc, other than the signal light reflecting on the target recording layer, a stray light reflecting on the recording layer other than that of the target also enters onto same light receiving parts. If the signal light and the stray light enter onto the light receiving parts, then two or more light beams interfere with each other, and fluctuating components thereof are detected on the tracking error signal.

For such problem, the Patent Document 1 adopts such structures that the light beam reflecting on the optical disc is diaphragmmed or stopped down by a condenser lens, and further the light widening after transmitting through two (2) pieces of quarter wave plates and the polarization optical element is stopped down by another condenser lens, thereby to be irradiated on a detector. For that reason, there is a problem that a detecting optic system comes to be complex and the optical pickup device comes to be large in sizes thereof.

In the Non-Patent Document 1 (Patent Document 2), because of the structures of disposing a photo detector for use of tracking in an outside of the stray light(s) from other layer(s) of the light beam for use of focusing, which is produced on a periphery of the photo detector for use of focusing, and further passing the light diffracting at a central portion of a hologram element into an outside of the stray light(s) from the other layer(s), there is also generated a problem of sizes of the apparatus and a problem of costs thereof, accompanying with large-sizing of the photo detectors.

According to the present invention, an object thereof is to provide an optical pickup device for enabling to obtain a stable servo-signal, when recording/reproducing an information recording medium having plural numbers of information recording surfaces, and for enabling small-sizing thereof, and an optical disc apparatus mounting it thereon.

The object mentioned above, according to the present invention, can be accomplished by the invention described in the claims.

According to the present invention, it is possible to provide an optical pickup device for enabling to obtain a stable servo-signal, when recording/reproducing an information recording medium having plural numbers of information recording surfaces, and for enabling small-sizing thereof, and an optical disc apparatus mounting it thereon.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Embodiment 1

Figure 1:
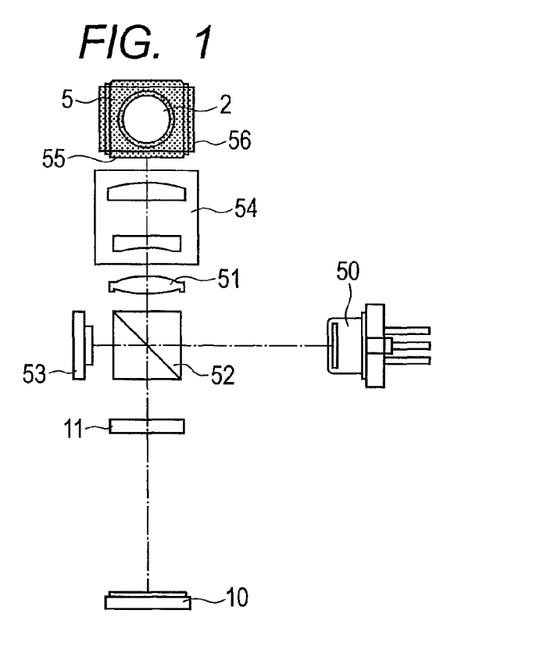
FIG. 1 is a view for explaining an optic system according to the present invention, in an embodiment 1.

FIG. 1 shows an optic system of an optical pickup device according to a first embodiment of the present invention. Herein, explanation will be given on a BD (Blu-ray Disc), but may be of other recording method, such as, a DVD (Digital Versatile Disc), etc. However, in the explanation, which will be given below, an optical disc has layers including, such as, a recording layer on a recording-type optical disc and/or a reproducing layer of an optical disc for exclusive use of reproduction.

From a laser diode 50 is emitted a light beam having a wavelength of about 405 nm, as a divergent light. The light beam emitting from the laser diode 50 is reflected on a beam splitter 52. However, a part of the light beam transmits through the beam splitter 52, and enters into a front monitor 53. In general, when recording information on an optical disc of recording type, such as, a BD-RE, a BD-R, etc., for irradiating a predetermined amount or volume of light upon a recording surface of the optical disc, it is necessary to control the volume of light from the laser diode at high accuracy. For this reason, when recording signals on the optical disc of recording type, detection is made on change of the light volume from the laser diode 50, so as to feed it back to a driver circuit (not shown in the figure) of the laser diode 50. With this, it is possible to monitor the light amount or volume on the optical disc.

The light beam reflecting on the beam splitter 52 is converted into a nearly parallel light beam by a collimating lens 51. The light beam transmitting through the collimating lens 51 enters into a beam expander 54. The beam expander 54 is used for the purpose of compensating a spherical aberration, which is caused due to an error in thickness of a cover layer, through changing divergence/convergence condition of the light beam. The light beam emitting from the beam expander 54, after reflecting on a reflection mirror and transmitting through a quarter wave plate 56, is condensed on an optical disc 100 by an objective lens 2, which is mounted on an actuator 5.

The light beam reflecting on the optical disc 100 enters into a diffraction grating 11, after passing through the objective lens 2, the quarter wave plate 56, the reflection mirror 55, the beam expander 54, the collimating lens 51 and the beam splitter 52. By means of the diffraction grating 11, the light beam is divided into plural numbers of regions, and in each of the regions, it progresses into the direction differing from one another, and forming a focus on the photo detector 10. On the photo detector 10 are formed plural numbers of light receiving parts, wherein on each light receiving part is irradiated the light beam, which is divided by the diffraction grating 11. Depending on the amounts or volumes of lights irradiating on the light receiving parts are outputted electric signals from the photo detector 10, and those outputs are calculated so as to produce reproduction signals, e.g., a RF signal, a focus error signal and a tracking error signal.

Figure 2:
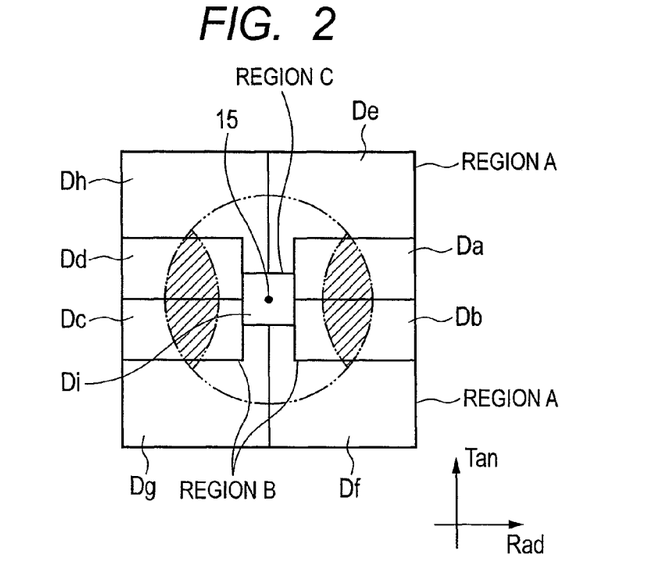
FIG. 2 is a view for showing a diffraction grating according to the present invention, in the embodiment 1.

FIG. 2 shows the configuration of the diffraction grating 11. Solid lines depict borderlines of the regions, 2-dotted chain lines depicts an outer shape of the light beam of the laser light, and portions treated with slanted lines depict an interference region (a push-pull pattern) of an $0^{th}$ dimensional diffraction light diffracted by a track of the optical disc and $\pm 1^{st}$ dimensional diffraction lights. The diffraction grating 11 is made up with regions De, Df, Dg, and Dh (region A) where only the $0^{th}$ dimensional diffraction light diffracting on the track on the disc enters therein, regions Da, Db, Dc and Dd (region B) where the $0^{th}$ dimensional diffraction light and the $\pm 1^{st}$ dimensional diffraction lights enter therein, and a region Di (region C).

Figure 3:
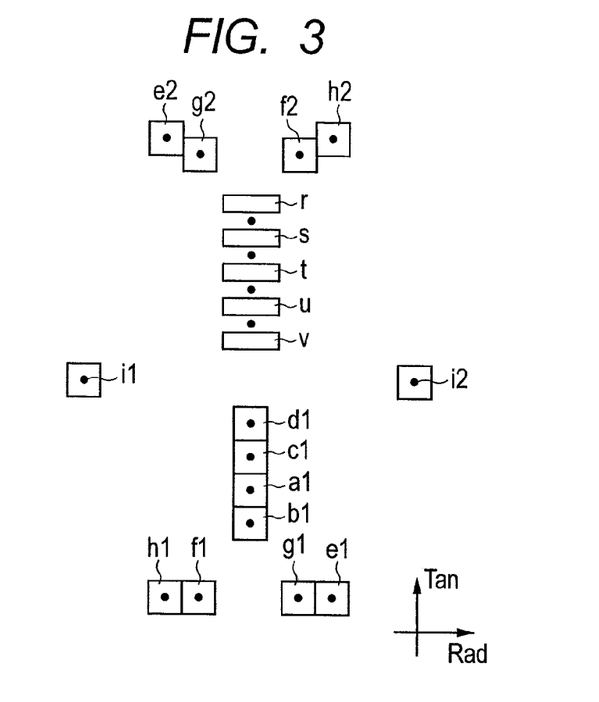
FIG. 3 is a view for showing an arrangement of light receiving parts of a photo detector according to the present invention, in the embodiment 1.

Diffraction efficiencies of the regions of the diffraction grating 11 other than the region Di are assumed, for example, the $0^{th}$ dimensional diffraction light: the $+1^{st}$ dimensional diffraction light: $-1^{st}$ dimensional diffraction light=0:7:3, and in the region Di, the $0^{th}$ dimensional light: the $+1^{st}$ dimensional light: $-1^{st}$ dimensional light=0:1:1, for example. The photo detector 10 is in a pattern as shown in FIG. 3. Black points depict signal lights.

Herein, the $+1^{st}$ dimensional lights diffracting in the regions Da, Db, Dc, Dd, De, Df, Dg, Dh and Di enter into the light receiving parts a1, b1, c1, d1, e1, f1, g1, h1 and i1 of the photo detector 10 shown in FIG. 3, respectively. Also, the $-1^{st}$ dimensional lights diffracting in the regions Da, Db, Dc and Dd enter into the light receiving parts r, s, t, u and v, and the $-1^{st}$ dimensional lights diffracting in the regions De, Df, Dg, Dh and Di enter into the light receiving parts e2, f2, g2, h2 and i2, respectively.

The focus error signal, the tracking error signal and RF signal are produced by executing the following calculations upon signals A1, B1, C1, D1, E1, F1, G1, H1, I1, R, S, T, U, V, E2, F2, G2, H2 and I2 obtained from the light receiving parts a1, b1, c1, d1, e1, f1, g1, h1, i1, r, s, t, u, v, e2, f2, g2, h2 and i2.

$$FES=(R+T+V)-(S+U)$$

$$TES=\{(A1+B1+E1+F1)-(C1+D1+G1+H1)\}-kt\times\{(E2+F2)-(G2+H2)\}$$

$$RF=A1+B1+C1+D1+E1+F1+G1+H1+I1+I2 \quad \text{(Eq. 1)}$$

Also, in relation to the tracking error signal, the following calculation may be made.

$$TES=\{(A1+B1)-(C1+D1)\}-kt\times\{(E1+F1)-(G1+H1)\} \quad \text{(Eq. 2)}$$

However, "kt" is such a coefficient that no DC component is generated in the tracking error signal when the objective lens is shifted. Herein, as a method for detecting the focus error is applied a knife-edge method, but since this method is already known, explanation thereof will be omitted.

Figure 4A:
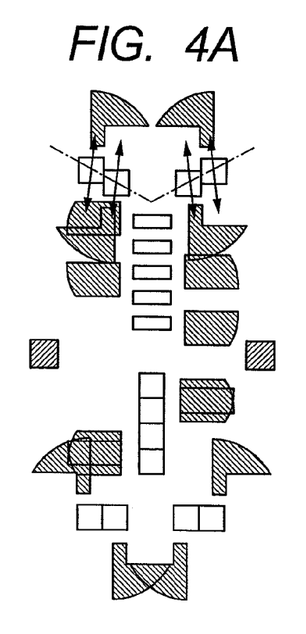
FIGS. 4A and 4B are views for showing stray lights from other layer(s) when recording/reproducing a dual layer disc according to the present invention, in the embodiment 1.
Figure 4B:
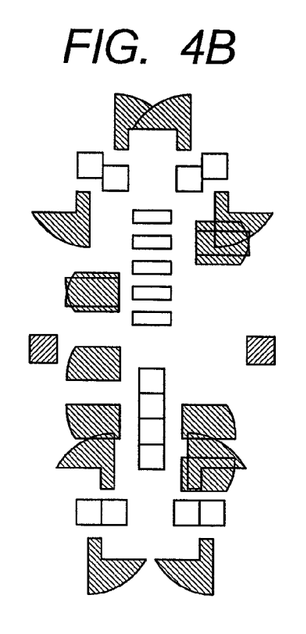

FIGS. 4A and 4B show a relationship between the light receiving parts when recording/reproducing a dual layer disc and stray lights from other layer(s). In the present embodiment, explanation will be made with using the dual layer disc; however, it is also possible to obtain similar effects with a disc having a number of layers much more than that. Herein, FIG. 4A shows when recording/reproducing L0, and FIG. 4B shows recording/reproducing L1. Further, parts treated with slanted lines in the figure depict the stray lights from the other layers of the dual layer disc. Also, arrows on the light receiving parts in FIG. 4A depict directions, into which the stray lights are faded or graduated, and one-dotted chain lines depict lines connecting between centers of the light receiving parts e2 and g2 and centers of the light receiving parts f2 and h2, respectively.

From those figures, it can be seen that, on those other than the light beam diffracting in the region Di of the diffraction grating 11, the signal lights and the stray lights from the other layers do not pile on light receiving surfaces thereof. However, since the signals I1 and I2 detected from the light receiving surfaces i1 and i2 are not used for detection of the tracking error signal, but only for detection of the reproduction signal, practically no problem is generated even if the stray light(s) is/are there.

In an actual detection of the signals, since the objective lens conducts recording/reproducing while following the track on the disc, the objective lens shifts into the radial direction (hereinafter, being called a "Rad direction"). When the objective lens shifts, only the stray light component is shifted on the photo detector. For this reason, upon a pattern of the light receiving surfaces of an ordinary photo detector, there is concern that, the stray light(s) from other layer(s) enter(s) into the light receiving surface(s) when the objective lens shifts. On the contrary to this, according to the present invention, with optimization of the photo detector 10 with respect to the pattern of the diffraction grating 11, there can be achieved a large tolerance of the objective lens for shifting. Herein, what should be taken into the consideration lies in an aspect, i.e., how to divide the signal light and the stray light in the direction of the lens shifting. About this, as is explained in Japanese Patent Laying-Open No. 2009-170060 (the Patent Document 3), in case where the regions of the diffraction grating are separated in the Rad direction (e.g., Da, Db, Dc and Dd (the region B) with respect to a center 15 of the light beam, the light receiving surfaces for detecting the light beam diffracting in those regions are aligned in the Tan direction, and thereby avoiding the stray light(s) into the Rad direction. Also, in case where the regions of the diffraction grating are separated in the Tan direction (e.g., Dh, De, Df and Dg (the area A)) with respect to the center 15 of the light beam, the light receiving surfaces for detecting the light beam diffracting in those areas are aligned in the Rad direction, and thereby avoiding the stray light(s) into the Tan direction.

Herein, explanation will be made about the difference between the present invention and the Patent Document 3. As was mentioned above, in the Patent Document 3, there is applied the diffraction grating 11, as in the present embodiment, i.e., the light receiving parts for detecting the light beams diffracting in the regions Da, Db, Dc and Dd (the region B) of the diffraction grating are aligned in the Tan direction, while aligning the light receiving parts for detecting the light beams diffracting in the region De, Df, Dg and Dh (the region B) in the Rad direction, and thereby avoiding the stray light(s) from other layer(s), effectively. However, the Patent Document 3 has the following problem from a viewpoint of reducing an optical pickup to be small in sizes thereof.

Figure 5:
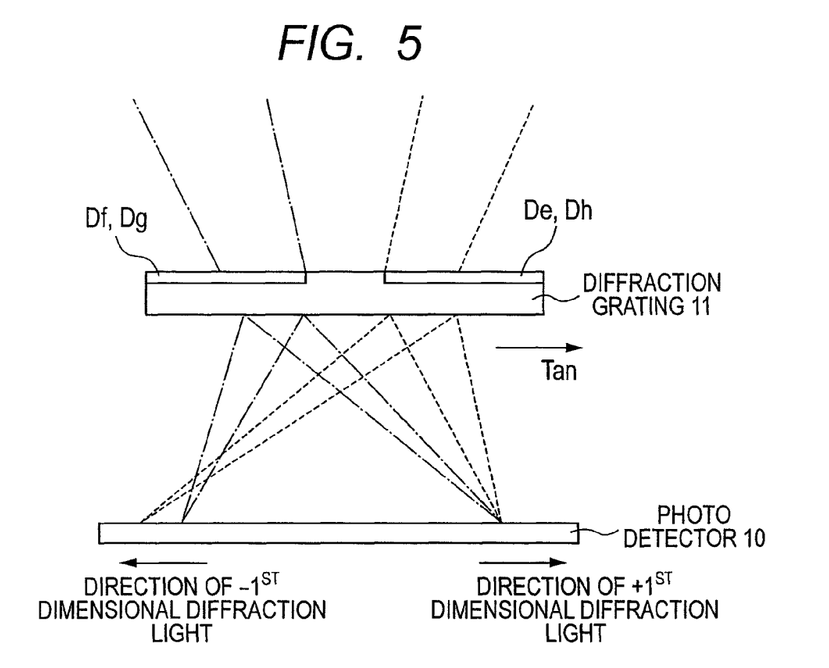
FIG. 5 is a view for explaining that a converging position differs from on the photo detector depending on a direction, into which a light beam enters, according to the present invention, in the embodiment 1.

For achieving a small-sized optical pickup, it is effective to make an optical magnification small. However, if the optical magnification in a way back is small, an incident angle of the light beam entering into the diffraction grating differs from, largely, depending upon each of regions on the diffraction grating. FIG. 5 shows a relationship among the light beam, the diffraction grating 11 and the photo detector 10 when seeing the diffraction grating 11 from a front side thereof in the Rad direction shown in FIG. 2. Herein, dotted lines in the figure depict the light beams entering into the regions De and Dh of the diffraction grating, and one-dotted chain lines depict the light beams entering into the regions Df and Dg of the diffraction grating. Herein, an aspect, upon which attention should be paid, is in that an incident angle of the light beams entering into the regions De and Dh of the diffraction grating differs from the incident angle of the light beams entering into the regions Df and Dg of the diffraction grating, largely. As a principle of the diffraction grating, the diffraction grating emits the light beam, which is diffracted to have the same diffraction angle, with respect to the incident angle of the light beam entering therein. For this reason, if bringing the $+1^{st}$ dimensional diffraction lights of the regions De, Df, Dg and Dh of the diffraction grating to be coincident with the positions in the Tan direction on the light receiving parts, then the $-1^{st}$ dimensional diffraction lights do not coincide with the positions in the Tan direction on the light receiving parts. Also, for example, if bringing the $-1^{st}$ dimensional diffraction lights of the regions De, Df, Dg and Dh of the diffraction grating to be coincident with the positions in the Tan direction on the light receiving parts, then the $+1^{st}$ dimensional diffraction lights do not coincide with the positions in the Tan direction. This is because, at least, either one of the $\pm 1^{st}$ dimensional diffraction lights can be brought to be coincident with the positions in the Tan direction. Herein, if enlarging the light receiving parts in the Tan direction, it is possible to deal with; however, if enlarging the light receiving parts, then accompanying this, the stray light(s) from other layer(s) enter(s) into the light receiving parts. And, it is also possible to dispose the light receiving parts fitting to the positions of the signal lights; however, depending on a method of arranging the light receiving parts, it results into the structure of entering the stray light(s) from other layer(s) therein.

Figure 6A:
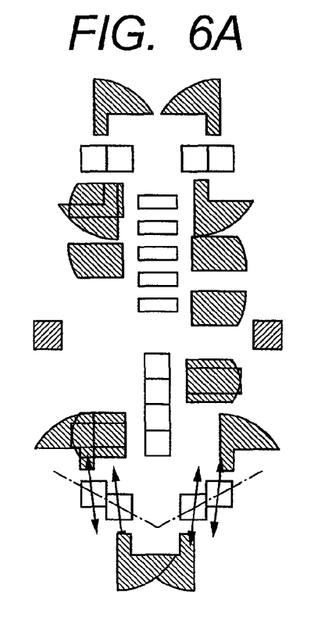
FIGS. 6A and 6B are views for showing stray lights from other layer(s) when recording/reproducing the dual layer disc on an arrangement of the light receiving parts, differing from the present invention shown in the embodiment 1.
Figure 6B:
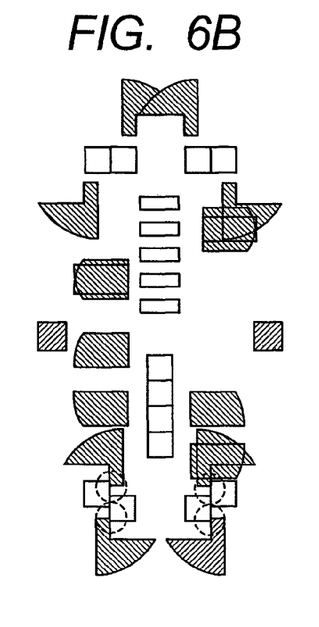

FIGS. 6A and 6B show a relationship between the light receiving parts and the stray lights from other layers when recoding/reproducing the dual layer disc, in particular, when aligning the light receiving parts (e.g., e2, f2, g2 and h2) on an opposite side of the present embodiment in the Rad direction. Further, FIG. 6A shows when recording/reproducing L0, and FIG. 6B shows when recording/reproducing L1, respectively.

Also, arrows on the light receiving parts in FIG. 6A depict directions, into which the stray lights are faded or graduated, and one-dotted chain lines depict lines connecting between centers of the light receiving parts e1 and g1 and centers of the light receiving parts f1 and h1, respectively.

From FIG. 6A, it can be seen that the stray lights are completed avoided therefrom, when recording/reproducing L0. On the contrary to this, when recording/reproducing L1, as is shown in FIG. 6B, the stray lights enter therein (see, the dotted line portions). Also, because of the fact that the stray lights also shift into the Rad direction, accompanying with following of the objective lens in the Rad direction, it is impossible to avoid the stray lights therefrom, with such structure shown in FIGS. 6A and 6B.

This depends on the direction, into which the stray lights fade away, and the angle define between the lines connecting the light receiving parts. The stray lights can enter therein, easily, depending on the direction (e.g., the arrows), into which the stray lights fade away, and shifting in the angle defined between the lines connecting the light receiving parts (e.g., the one-dotted chain lines) from a right angle, and for example, when the direction into which the stray lights fade away, and the angle defined between the lines connecting the light receiving parts (e.g., the one-dotted chain lines) comes to 0 or 180 degrees, then the stray lights enter into the light receiving parts neighboring with one another, completely. For this reason, it is important to bring the direction (e.g., the arrows), into which the stray lights fade away, and the angle defined between the lines connecting the light receiving parts (e.g., the one-dotted chain lines) to be close to the right angle. Herein, in case of the arrangement of the light receiving parts according to the present embodiment, there can be considered the arrangement of the light receiving parts shown in FIG. 3 (or FIGS. 4A and 4B) and the arrangement of the light receiving parts shown in FIGS. 6A and 6B; however, since it is the arrangement of the light receiving parts of the present embodiment shown in FIG. 3 (or FIGS. 4A and 4B) where the direction (e.g., the arrows), into which the stray lights fade away, and the angle defined between the lines connecting the light receiving parts (e.g., the one-dotted chain lines) come close to be vertical, and with adopting the arrangement in this manner, it is possible to avoid the stray lights, effectively.

Also, as a characteristic of the present embodiment, it is in an aspect that the light receiving parts are disposed neighboring with each other, for detecting the diffraction lights in the regions (i.e., point-symmetric regions with respect to a center of the diffraction grating. For example, regions Da and Dc, and regions Db and Dd) of the diffraction grating, where the directions, into which the stray lights fade away, are nearly equal to. With disposing them in this manner, since the directions, into which the stray lights fade away, are same to, on the light receiving parts neighboring to each other, therefore it is easy to avoid the stray lights therefrom.

Further, with the structure of the present embodiment shown in FIG. 3 (or FIGS. 4A and 4B), the light receiving parts r, s, t, u, v, e2, f2, g2 and h2 for the −1$^{st}$ dimensional diffraction light are disposed in a shape of "Y", and thereby obtaining the arrangement of the light receiving parts, hardly receiving ill influences of the stray lights on the light receiving parts r, s, t, u, v, e2, f2, g2 and h2. Also, with an arrangement of disposing the light receiving parts a1, b1, c1, d1, e1, f1, g1 and h1 for the +1$^{st}$ dimensional diffraction lights in a shape of "T", it is also possible to avoid the stray lights, effectively, similar to the Patent Document 3.

Figure 7A:
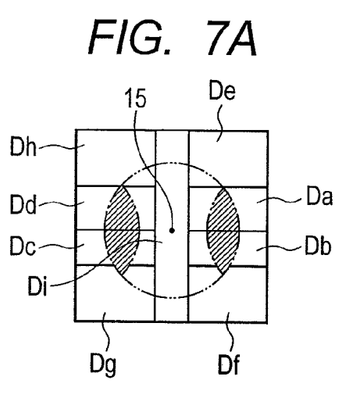
FIGS. 7A and 7B are views for showing other diffraction grating according to the present invention, in the embodiment 1.
Figure 7B:
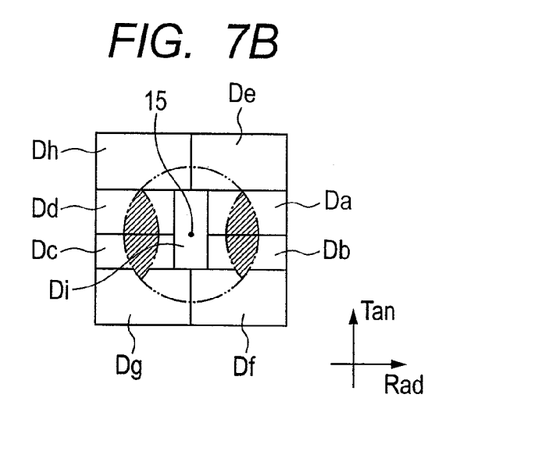

As was mentioned above, when diffracting the light beams entering into at least four (4) regions divided by dividing lines, passing through a center of the diffraction grating nearly in the Tan direction and the Rad direction, but not including the dividing line nearly in the Rad direction, nearly into the Tan direction, and when aligning them nearly into the Rad direction on the photo detector; the light receiving parts, for either one diffraction light, such as, the +1$^{st}$ dimensional diffraction light or the −1$^{st}$ dimensional diffraction light, are aligned nearly on a straight line, nearly in the Rad direction, while shifting the light receiving parts of the diffraction grating for the other diffraction light in the Tan direction, and thereby it is possible to divide the signal lights and the stray lights, effectively, even when reducing the optical magnification to be small. With this, it is possible to detect stable servo-signals, even if reducing the optical magnification to be small, and small-sizing the optical pickup device. However, in the present embodiment, the diffraction grating 11, although explanation was given by referring to FIG. 2, can obtain the similar effects, even if it is in a pattern shown in FIGS. 7A and 7B. Further, although the diffraction grating is disposed after passing through the beam splitter, according to the present embodiment; however the similar effects can be obtained if replacing the diffraction grating 11 by a polarization diffraction grating, and disposing it before passing through the beam splitter. Also, with spherical aberration compensation, there is no restriction. Also, according to the present embodiment, the diffraction light in the region Di of the diffraction grating is detected on the light receiving parts i1 and i2; however the present invention should not be limited to this, it may be detected on a light receiving surface on one side. And, according to the present embodiment, the light receiving parts a1, b1, c1, d1, e1, f1, g1 and h1 for the +1$^{st}$ dimensional diffraction light are aligned in the shape of "T", while the light receiving parts r, s, t, u, v, e2, f2, g2 and h2 for the −1$^{st}$ dimensional diffraction light are aligned in the shape of "Y"; however, not limited to this, for example, the light receiving parts for the −1$^{st}$ dimensional diffraction light may be disposed in the shape of "T" by replacing the light signals on the light receiving parts neighboring with, while disposing the light receiving parts for the +1$^{st}$ dimensional diffraction light in the shape of "Y". Also, the similar effects can be obtained even if it is the diffraction light of other dimension.

Embodiment 2

Figure 8:
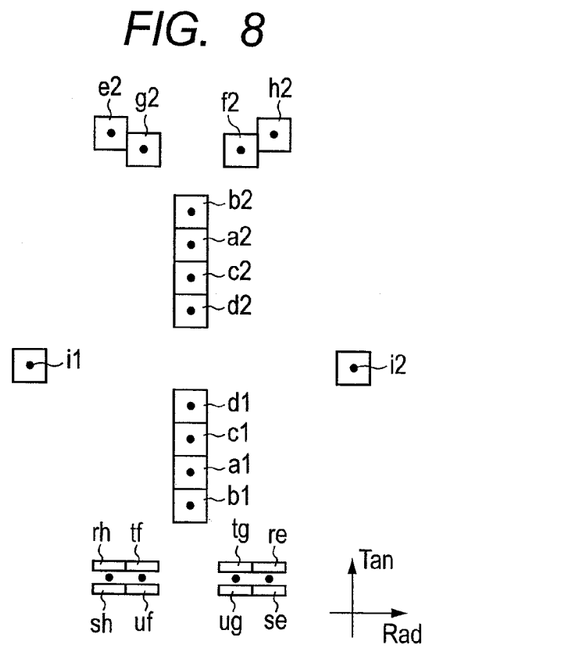
FIG. 8, is a view for showing an arrangement of light receiving parts of a photo detector according to the present invention, in an embodiment 2.

FIG. 8 is a view for showing the light receiving parts of the photo detector 10 of the optical pickup device, according to a second embodiment of the present invention. Difference from the embodiment 1 lies in that the light receiving parts of the photo detector 10 are different from, but other than those are similar to those of the embodiment 1, in the structure thereof.

From a laser diode 50 is emitted a light beam having a wavelength of about 405 nm, as a divergent light. The light beam emitting from the laser diode 50 is reflected on a beam splitter 52. However, a part of the light beam transmits through the beam splitter 52, and enters into a front monitor 53. In general, when recording information on an optical disc of recording type, such as, a BD-RE, a BD-R, etc., for irradiating a predetermined amount or volume of light upon a recording surface of the optical disc, it is necessary to control the volume of light from the laser diode at high accuracy. For this reason, when recording signals on the optical disc of recording type, detection is made on change of the light volume from the laser diode 50, so as to feed it back to a driver circuit (not shown in the figure) of the laser diode 50. With this, it is possible to monitor the light amount or volume on the optical disc.

The light beam reflecting on the beam splitter 52 is converted into a nearly parallel light beam by a collimating lens

51. The light beam transmitting through the collimating lens 51 enters into a beam expander 54. The beam expander 54 is used for the purpose of compensating a spherical aberration, which is caused due to an error in thickness of a cover layer, through changing divergence/convergence condition of the light beam. The light beam emitting from the beam expander 54, after reflecting on a reflection mirror and transmitting through a quarter wave plate 56, is condensed on an optical disc 100 by an objective lens 2, which is mounted on an actuator 5.

The light beam reflecting on the optical disc 100 enters into a diffraction grating 11, after passing through the objective lens 2, the quarter wave plate 56, the reflection mirror 55, the beam expander 54, the collimating lens 51 and the beam splitter 52. By means of the diffraction grating 11, the light beam is divided into plural numbers of regions, and in each of the regions, it progresses into the direction differing from one another, and forming a focus on the photo detector 10. On the photo detector 10 are formed plural numbers of light receiving parts, wherein on each light receiving part is irradiated the light beam, which is divided by the diffraction grating 11. Depending on the amounts or volumes of lights irradiating on the light receiving parts are outputted electric signals from the photo detector 10, and those outputs are calculated so as to produce reproduction signals, e.g., a RF signal, a focus error signal and a tracking error signal.

FIG. 2 shows the configuration of the diffraction grating 11. Solid lines depict borderlines of the regions, 2-dotted chain lines depicts an outer shape of the light beam of the laser light, and portions treated with slanted lines depict an interference region (a push-pull pattern) of an $0^{th}$ dimensional diffraction light diffracted by a track of the optical disc and $\pm 1^{st}$ dimensional diffraction lights. The diffraction grating 11 is made up with regions De, Df, Dg, and Dh (region A) where only the $0^{th}$ dimensional diffraction light diffracting on the track on the disc enters therein, regions Da, Db, Dc and Dd (region B) where the $0^{th}$ dimensional diffraction light and the $\pm 1^{st}$ dimensional diffraction lights enter therein, and a region Di (region C).

Diffraction efficiencies of the regions of the diffraction grating 11 other than the region Di are assumed, for example, the $0^{th}$ dimensional diffraction light: the $+1^{st}$ dimensional diffraction light: $-1^{st}$ dimensional diffraction light=0:7:3, and in the region Di, the $0^{th}$ dimensional light: the $+1^{st}$ dimensional light: $-1^{st}$ dimensional light=0:1:1, for example. The photo detector 10 is in a pattern as shown in FIG. 8. Black points depict signal lights.

Herein, the $+1^{st}$ dimensional lights diffracting in the regions Da, Db, Dc, Dd and Di enter into the light receiving parts a1, b1, c1, d1 and i1 of the photo detector 10 shown in FIG. 8, respectively, and the $+1^{st}$ dimensional lights diffracting in the regions De, Df, Dg and Dh enter into the light receiving parts re, se, tf, uf, tg, ug, rh and sh for use of detection of the focus error signal. Also, the $-1^{st}$ dimensional lights diffracting in the regions Da, Db, Dc, Dd, De, Df, Dg, Dh and Di enter into the light receiving parts a2, b2, c2, d2, e2, f2, g2, h2 and i2, respectively.

The focus error signal, the tracking error signal and RF signal are produced by executing the following calculations upon signals A1, B1, C1, D1, I1, RE, SE, TF, UF, TG, UG, RH, SH, A2, B2, C2, D2, E2, F2, G2, H2 and I2 obtained from the light receiving parts a1, b1, c1, d1, i1, re, se, tf, uf, tg, ug, rh, sh, a2, b2, c2, d2, e2, f2, g2, h2 and i2.

$$FES=(SE+TG+TF+SH)-(RE+UG+UF+RH)$$

$$TES=\{(A1+A2+B1+B2)-(C1+C2+D1+D2)\}-kt\times\{(E2+F2)-(G2+H2)\}$$

$$RF=A1+B1+C1+D1+E1+F1+G1+H1+I1+I2 \quad \text{(Eq. 3)}$$

However, "kt" is such a coefficient that no DC component is generated in the tracking error signal when the objective lens is shifted. Herein, as a method for detecting the focus error is applied a knife-edge method, but since this method is already known, explanation thereof will be omitted. Also, in the equation, since the signals A1, B1, C1 and D1 are same to the signals A2, B2, C2 and D2 in the component thereof, they may be omitted in the calculation thereof.

With the structure according to the present embodiment, since being similar to that of the embodiment 1 in relation to the stray lights of the multi-layer disc, it is possible to avoid the stray lights of the multi-layer disc, effectively. For this reason, it is possible to detect stable servo-signals.

The structure of the present embodiment, similar to that of the embodiment 1, i.e., disposing the light receiving parts a2, b2, c2, d2, e2, f2, g2 and h2 for the $-1^{st}$ dimensional diffraction light are disposed in the shape of "Y", has such arrangement of the light receiving parts that the light receiving parts a2, b2, c2, d2, e2, f2, g2 and h2 hardly receive ill influences of the stray lights. Also, with the arrangement of disposing the light receiving parts a1, b1, c1, d1, re, se, tg, ug, tf, uf, rh and sh in the shape of "T", for the $+1^{st}$ dimensional diffraction light, it is possible to avoid the stray lights, effectively, similar that shown in the Patent Document 3.

As was mentioned above, when diffracting the light beams entering into at least four (4) regions divided by dividing lines, passing through a center of the diffraction grating nearly in the Tan direction and the Rad direction, but not including the dividing line nearly in the Rad direction, nearly into the Tan direction, and when aligning them nearly into the Rad direction on the photo detector; the light receiving parts, for either one diffraction light, such as, the $+1^{st}$ dimensional diffraction light or the $-1^{st}$ dimensional diffraction light, are aligned nearly on a straight line, nearly in the Rad direction, while shifting the light receiving parts of the diffraction grating for the other diffraction light in the Tan direction, and thereby it is possible to divide the signal lights and the stray lights, effectively, even when reducing the optical magnification to be small. With this, e it is possible to detect stable servo-signals, even if reducing the optical magnification to be small, and small-sizing the optical pickup device. However, in the present embodiment, the diffraction grating 11, although explanation was given by referring to FIG. 2, can obtain the similar effects, even if it is in a pattern shown in FIGS. 7A and 7B. Further, although the diffraction grating is disposed after passing through the beam splitter, according to the present embodiment; however the similar effects can be obtained if replacing the diffraction grating 11 by a polarization diffraction grating, and disposing it before passing through the beam splitter. Also, with spherical aberration compensation, there is no restriction. Also, according to the present embodiment, the diffraction light in the region Di of the diffraction grating is detected on the light receiving parts i1 and i2; however the present invention should not be limited to this, it may be detected on a light receiving surface on one side. And, according to the present embodiment, the light receiving parts a1, b1, c1, d1, re, se, tg, ug, tf, uf, rh and sh for the $+1^{st}$ dimensional diffraction light are aligned in the shape of "T", while the light receiving parts a2, b2, c2, d2, e2, f2, g2 and h2 for the $-1^{st}$ dimensional diffraction light are aligned in the shape of "Y"; however, not limited to this, for example, the light receiving parts for the $-1^{st}$ dimensional diffraction light may be disposed in the shape of "T" by replacing the light signals on the light receiving parts neighboring with, while disposing the light receiving parts for the $+1^{st}$ dimensional diffraction light in the shape of "Y". Also, the similar effects can be obtained even if it is the diffraction light of other dimension.

Embodiment 3

Figure 9:
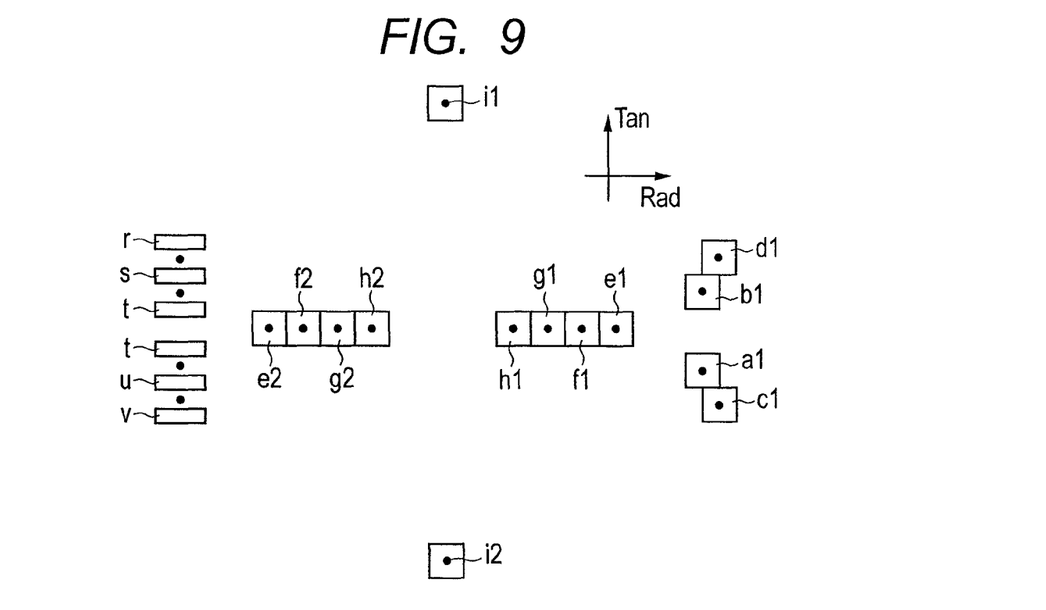
FIG. 9 is a view for showing an arrangement of light receiving parts of a photo detector according to the present invention, in an embodiment 3.

FIG. 9 is a view for showing the light receiving parts of the photo detector 10 of the optical pickup device, according to a third embodiment of the present invention. Difference from the embodiment 1 lies in that the light receiving parts of the photo detector 10 are different from, but other than those are similar to those of the embodiment 1, in the structure thereof.

From a laser diode 50 is emitted a light beam having a wavelength of about 405 nm, as a divergent light. The light beam emitting from the laser diode 50 is reflected on a beam splitter 52. However, a part of the light beam transmits through the beam splitter 52, and enters into a front monitor 53. In general, when recording information on an optical disc of recording type, such as, a BD-RE, a BD-R, etc., for irradiating a predetermined amount or volume of light upon a recording surface of the optical disc, it is necessary to control the volume of light from the laser diode at high accuracy. For this reason, when recording signals on the optical disc of recording type, detection is made on change of the light volume from the laser diode 50, so as to feed it back to a driver circuit (not shown in the figure) of the laser diode 50. With this, it is possible to monitor the light amount or volume on the optical disc.

The light beam reflecting on the beam splitter 52 is converted into a nearly parallel light beam by a collimating lens 51. The light beam transmitting through the collimating lens 51 enters into a beam expander 54. The beam expander 54 is used for the purpose of compensating a spherical aberration, which is caused due to an error in thickness of a cover layer, through changing divergence/convergence condition of the light beam. The light beam emitting from the beam expander 54, after reflecting on a reflection mirror and transmitting through a quarter wave plate 56, is condensed on an optical disc 100 by an objective lens 2, which is mounted on an actuator 5.

The light beam reflecting on the optical disc 100 enters into a diffraction grating 11, after passing through the objective lens 2, the quarter wave plate 56, the reflection mirror 55, the beam expander 54, the collimating lens 51 and the beam splitter 52. By means of the diffraction grating 11, the light beam is divided into plural numbers of regions, and in each of the regions, it progresses into the direction differing from one another, and forming a focus on the photo detector 10. On the photo detector 10 are formed plural numbers of light receiving parts, wherein on each light receiving part is irradiated the light beam, which is divided by the diffraction grating 11. Depending on the amounts or volumes of lights irradiating on the light receiving parts are outputted electric signals from the photo detector 10, and those outputs are calculated so as to produce reproduction signals, e.g., a RF signal, a focus error signal and a tracking error signal.

FIG. 2 shows the configuration of the diffraction grating 11. Solid lines depict borderlines of the regions, 2-dotted chain lines depicts an outer shape of the light beam of the laser light, and portions treated with slanted lines depict an interference region (a push-pull pattern) of an $0^{th}$ dimensional diffraction light diffracted by a track of the optical disc and $\pm 1^{st}$ dimensional diffraction lights. The diffraction grating 11 is made up with regions De, Df, Dg, and Dh (region A) where only the $0^{th}$ dimensional diffraction light diffracting on the track on the disc enters therein, regions Da, Db, Dc and Dd (region B) where the $0^{th}$ dimensional diffraction light and the $\pm 1^{st}$ dimensional diffraction lights enter therein, and a region Di (region C).

Diffraction efficiencies of the regions of the diffraction grating 11 other than the region Di are assumed, for example, the $0^{th}$ dimensional diffraction light: the $+1^{st}$ dimensional diffraction light: $-1^{st}$ dimensional diffraction light=0:7:3, and in the region Di, the $0^{th}$ dimensional light: the $+1^{st}$ dimensional light: $-1^{st}$ dimensional light=0:1:1, for example. The photo detector 10 is in a pattern as shown in FIG. 9. Black points depict signal lights.

Herein, the $+1^{st}$ dimensional lights diffracting in the regions Da, Db, Dc, Dd, De, Df, Dg, Dh and Di enter into the light receiving parts a1, b1, c1, d1, e1, f1, g1, h1 and i1 of the photo detector 10 shown in FIG. 9, respectively. Also, the $-1^{st}$ dimensional lights diffracting in the regions Da, Db, Dc and Dd enter into the light receiving parts r, s, t, u and v. Also, the $-1^{st}$ dimensional lights diffracting in the regions De, Df, Dg, Dh and Di enter into the light receiving parts e2, f2, g2, h2 and i2, respectively.

The focus error signal, the tracking error signal and RF signal are produced by executing the following calculations upon signals A1, B1, C1, D1, E1, F1, G1, H1, I1, R, S, T, U, V, E2, F2, G2, H2 and I2 obtained from the light receiving parts a1, b1, c1, d1, e1, f1, g1, h1, i1, r, s, t, u, v, e2, f2, g2, h2 and i2.

$FES=(R+T+V)-(S+U)$ $TES=\{(A1+B1+E1+F1)-(C1+D1+G1+H1)\}-kt\times\{(E2+F2)-(G2+H2)\}$ $RF=A1+B1+C1+D1+E1+F1+G1+H1+I1+I2$ (Eq. 4)

However, "kt" is such a coefficient that no DC component is generated in the tracking error signal when the objective lens is shifted. Herein, as a method for detecting the focus error is applied a knife-edge method, but since this method is already known, explanation thereof will be omitted.

Figure 10A:
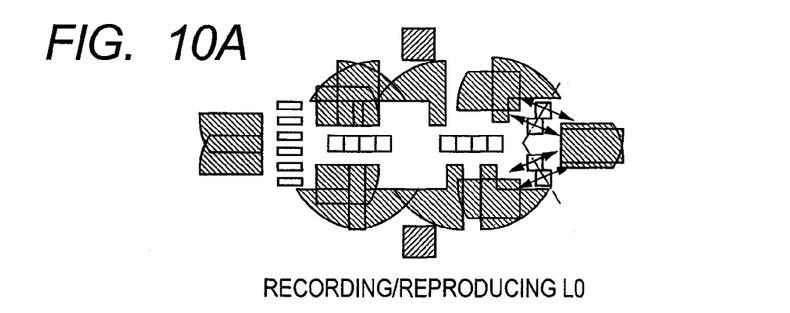
FIGS. 10A and 10B are views for showing stray lights from other layer(s) when recording/reproducing a dual layer disc according to the present invention, in the embodiment 3.
Figure 10B:
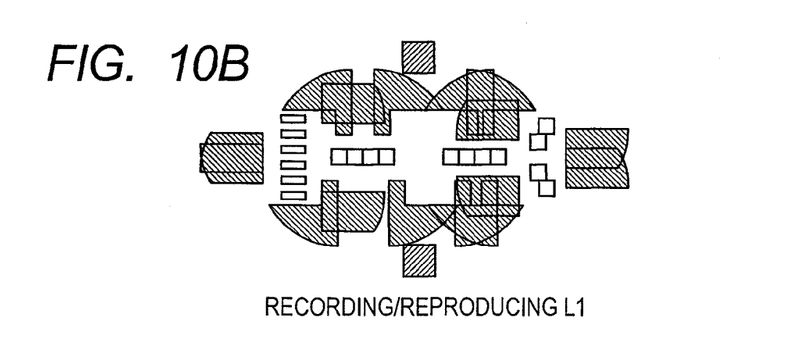

FIGS. 10A and 10B show a relationship between the light receiving parts when recording/reproducing a dual layer disc and stray lights from other layer(s). In the present embodiment, explanation will be made with using the dual layer disc; however, it is also possible to obtain similar effects with a disc having a number of layers much more than that. Herein, FIG. 10A shows when recording/reproducing L0, and FIG. 10B shows recording/reproducing L1. Further, parts treated with slanted lines in the figure depict the stray lights from the other layers of the dual layer disc. Also, arrows on the light receiving parts in FIG. 10A depict directions, into which the stray lights are faded or graduated, and one-dotted chain lines depict lines connecting between centers of the light receiving parts a2 and c2 and centers of the light receiving parts b2 and d2, respectively.

From those figures, it can be seen that, on those other than the light beam diffracting in the region Di of the diffraction grating 11, the signal lights and the stray lights from the other layers do not pile on light receiving surfaces thereof. However, since the signals I1 and I2 detected from the light receiving surfaces i1 and i2 are not used for detection of the tracking error signal, but only for detection of the reproduction signal, practically no problem is generated even if the stray light(s) is/are there.

Comparing to the embodiment 1, the present embodiment is characterized in that the directions of diffractions are changed. In the embodiment 1, the light beams entering into the regions De, Df, Dg and Dh (i.e., the region A) of the diffraction grating are diffracted nearly into the Tan direction, and thereby the incident direction comes to be coincident with the diffraction direction. For this reason, it is necessary to shift the light receiving parts, which are aligned nearly in the Rad direction, into the Tan direction. Similarly, in the present embodiment, the light beams entering into the regions Da, Db, Dc and Dd of the diffraction grating are diffracted nearly into the Rad direction, and thereby the incident direction comes to be coincident with the diffraction direction. For this reason, the light receiving parts, which are aligned nearly into the Tan direction, are shifted into the Rad direction. As a manner of shifting, similar to that of the embodiment 1, with adopting the structure of approaching the direction (e.g., arrows), in which the stray lights fade away, and the direction (e.g., one-dotted chain lines) defined between the lines connecting the light receiving parts, to be vertical, the stray light can be avoided therefrom, effectively.

With the structure of the present embodiment, similar to the embodiment 1, the light receiving parts a1, b1, c1, d1, e1, f1, g1 and h1 for the $+1^{st}$ dimensional diffraction light are disposed in the shape of "Y", and thereby obtaining the arrangement of the light receiving parts, hardly receiving ill influences of the stray lights on the light receiving parts a1, b1, c1, d1, e1, f1, g1 and h1. Also, with an arrangement of disposing the light receiving parts r, s, t, u, v, e2, f2, g2 and h2 for the $-1^{st}$ dimensional diffraction lights in the shape of "T", it is also possible to avoid the stray lights, effectively, similar to the Patent Document 3.

As was mentioned above, when diffracting the light beams entering into at least four (4) regions divided by dividing lines, passing through a center of the diffraction grating nearly in the Tan direction and the Rad direction, but not including the dividing line nearly in the Tan direction, nearly into the Rad direction, and when aligning them nearly into the Tan direction on the photo detector; the light receiving parts, for either one diffraction light, such as, the $+1^{st}$ dimensional diffraction light or the $-1^{st}$ dimensional diffraction light, are aligned nearly on a straight line, nearly in the Tan direction, while shifting the light receiving parts of the diffraction grating for the other diffraction light in the Rad direction, and thereby it is possible to divide the signal lights and the stray lights, effectively, even when reducing the optical magnification to be small. With this, it is possible to detect stable servo-signals, even if reducing the optical magnification to be small, and small-sizing the optical pickup device. However, in the present embodiment, the diffraction grating 11, although explanation was given by referring to FIG. 2, can obtain the similar effects, even if it is in a pattern shown in FIGS. 7A and 7B. Further, although the diffraction grating is disposed after passing through the beam splitter, according to the present embodiment; however the similar effects can be obtained if replacing the diffraction grating 11 by a polarization diffraction grating, and disposing it before passing through the beam splitter. Also, with spherical aberration compensation, there is no restriction. Also, according to the present embodiment, the diffraction light in the region Di of the diffraction grating is detected on the light receiving parts i1 and i2; however the present invention should not be limited to this, it may be detected on a light receiving surface on one side. And, according to the present embodiment, the light receiving parts a1, b1, c1, d1, e1, f1, g1 and h1 for the $+1^{st}$ dimensional diffraction light are aligned in the shape of "T", while the light receiving parts r, s, t, u, v, e2, f2, g2 and h2 for the $-1^{st}$ dimensional diffraction light are aligned in the shape of "Y"; however, not limited to this, for example, the light receiving parts for the $-1^{st}$ dimensional diffraction light may be disposed in the shape of "T" by replacing the light signals on the light receiving parts neighboring with, while disposing the light receiving parts for the $+1^{st}$ dimensional diffraction light in the shape of "Y". Also, the similar effects can be obtained even if it is the diffraction light of other dimension.

Embodiment 4

Figure 11:
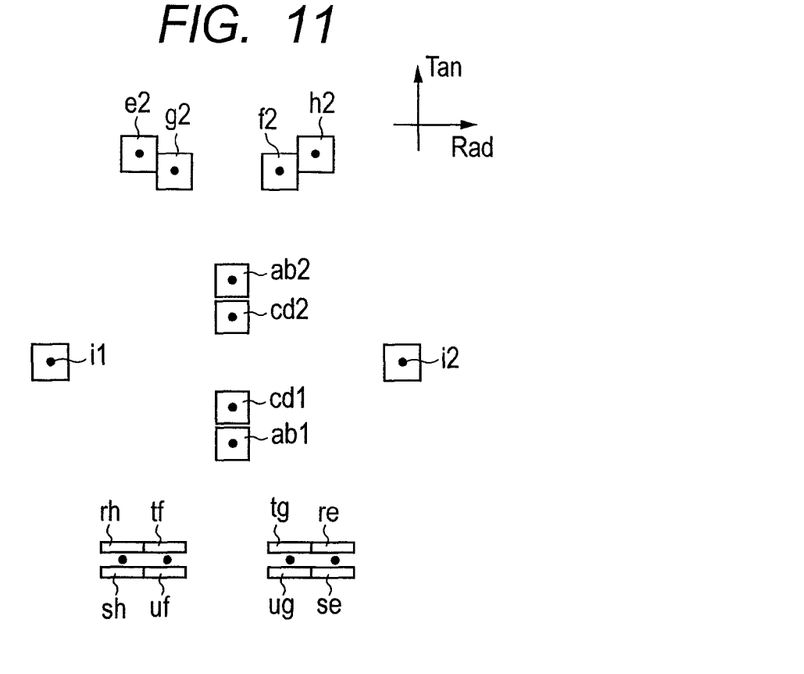
FIG. 11 is a view for showing an arrangement of light receiving parts of a photo detector according to the present invention, in an embodiment 4.

FIG. 11 is a view for showing the light receiving parts of the photo detector 10 of the optical pickup device, according to a fourth embodiment of the present invention. Difference lies in that the light receiving parts of the photo detector 10 and the regions of the diffraction grating 11 are different from, but other than those are similar to those of the embodiment 1, in the structure thereof.

From a laser diode 50 is emitted a light beam having a wavelength of about 405 nm, as a divergent light. The light beam emitting from the laser diode 50 is reflected on a beam splitter 52. However, a part of the light beam transmits through the beam splitter 52, and enters into a front monitor 53. In general, when recording information on an optical disc of recording type, such as, a BD-RE, a BD-R, etc., for irradiating a predetermined amount or volume of light upon a recording surface of the optical disc, it is necessary to control the volume of light from the laser diode at high accuracy. For this reason, when recording signals on the optical disc of recording type, detection is made on change of the light volume from the laser diode 50, so as to feed it back to a driver circuit (not shown in the figure) of the laser diode 50. With this, it is possible to monitor the light amount or volume on the optical disc.

The light beam reflecting on the beam splitter 52 is converted into a nearly parallel light beam by a collimating lens 51. The light beam transmitting through the collimating lens 51 enters into a beam expander 54. The beam expander 54 is used for the purpose of compensating a spherical aberration, which is caused due to an error in thickness of a cover layer, through changing divergence/convergence condition of the light beam. The light beam emitting from the beam expander 54, after reflecting on a reflection mirror and transmitting through a quarter wave plate 56, is condensed on an optical disc 100 by an objective lens 2, which is mounted on an actuator 5.

The light beam reflecting on the optical disc 100 enters into a diffraction grating 11, after passing through the objective lens 2, the quarter wave plate 56, the reflection mirror 55, the beam expander 54, the collimating lens 51 and the beam splitter 52. By means of the diffraction grating 11, the light beam is divided into plural numbers of regions, and in each of the regions, it progresses into the direction differing from one another, and forming a focus on the photo detector 10. On the photo detector 10 are formed plural numbers of light receiving parts, wherein on each light receiving part is irradiated the light beam, which is divided by the diffraction grating 11. Depending on the amounts or volumes of lights irradiating on the light receiving parts are outputted electric signals from the photo detector 10, and those outputs are calculated so as to produce reproduction signals, e.g., a RF signal, a focus error signal and a tracking error signal.

Figure 12:
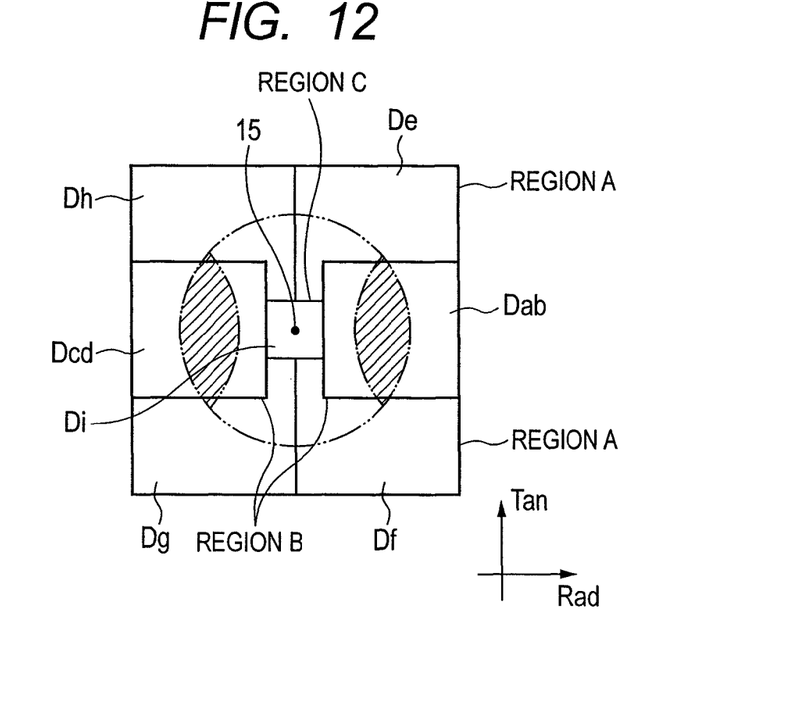
FIG. 12 is a view for showing a diffraction grating according to the present invention, in the embodiment 4.

FIG. 12 shows the configuration of the diffraction grating 11. Solid lines depict borderlines of the regions, 2-dotted chain lines depicts an outer shape of the light beam of the laser light, and portions treated with slanted lines depict an interference region (a push-pull pattern) of an $0^{th}$ dimensional diffraction light diffracted by a track of the optical disc and ±1$^{st}$ dimensional diffraction lights. The diffraction grating 11 is made up with regions De, Df, Dg, and Dh (region A) where only the 0$^{th}$ dimensional diffraction light diffracting on the track on the disc enters therein, regions Dab and Dcd (region B) where the 0$^{th}$ dimensional diffraction light and the ±1$^{st}$ dimensional diffraction lights enter therein, and a region Di (region C).

Diffraction efficiencies of the regions of the diffraction grating 11 other than the region Di are assumed, for example, the 0$^{th}$ dimensional diffraction light: the +1$^{st}$ dimensional diffraction light: −1$^{st}$ dimensional diffraction light=0:3:7, and in the region Di, the 0$^{th}$ dimensional light: the +1$^{st}$ dimensional light: −1$^{st}$ dimensional light=0:1:1, for example. The photo detector 10 is in a pattern as shown in FIG. 11. Black points depict signal lights.

Herein, the +1$^{st}$ dimensional lights diffracting in the regions Dab, Dcd and Di enter into the light receiving parts ab1, cd1 and i1 of the photo detector 10 shown in FIG. 11, and the +1$^{st}$ dimensional lights diffracting in the regions De, Df, Dg and Dh enter into the light receiving parts re, se, tg, ug, tf, uf, rh and sh for use of detection of the focus error signal, respectively. Also, the −1$^{st}$ dimensional lights diffracting in the regions Dab, Dcd, De, Df, Dg, Dh and Di enter into the light receiving parts ab2, cd2, e2, f2, g2, h2 and i2, respectively.

The focus error signal, the tracking error signal and RF signal are produced by executing the following calculations upon signals AB1, CD1, I1, RE, SE, TF, UF, TG, UG, RH, SH, AB2, CD2, E2, F2, G2, H2 and I2 obtained from the light receiving parts ab1, cd1, i1, re, se, tf, uf, tg, ug, rh, sh, ab2, cd2, e2, f2, g2, h2 and i2.

$$FES=(SE+TG+TF+SH)-(RE+UG+UF+RH)$$

$$TES=\{(AB1+AB2)-(CD1+CD2)\}-kt\times\{(E2+F2)-(G2+H2)\}$$

$$RF=AB1+CD1+E1+F1+G1+H1+I1+I2 \quad \text{(Eq. 5)}$$

However, "kt" is such a coefficient that no DC component is generated in the tracking error signal when the objective lens is shifted. Herein, as a method for detecting the focus error is applied a knife-edge method, but since this method is already known, explanation thereof will be omitted. Also, in the equation, since the signals AB1 and CD1 are same to the signals A2, B2, C2 and D2 in the component thereof, they may be omitted in the calculation thereof.

In the structure of the present embodiment, comparing to the embodiment 2, since the regions Da and Db or the regions Dc and Dd are formed only as one (1) region, respectively, it is apparent that the stray lights from the multi-layers do not enter into the light receiving parts, from the embodiments 1 and 2. For this reason, even with the structure of the present embodiment, it is possible to detect the stable servo-signals.

With the structure of the present embodiment, similar to the embodiment 1, the light receiving parts ab2, cd2, e2, f2, g2 and h2 for the +1$^{st}$ dimensional diffraction light are disposed in the shape of "Y", and thereby obtaining the arrangement of the light receiving parts, hardly receiving ill influences of the stray lights on the light receiving parts ab2, cd2, e2, f2, g2 and h2. Also, with an arrangement of disposing the light receiving parts ab1, cd1, re, se, tg, ug, rh and sh for the −1$^{st}$ dimensional diffraction lights in the shape of "T", it is also possible to avoid the stray lights, effectively, similar to the Patent Document 3.

Figure 13A:
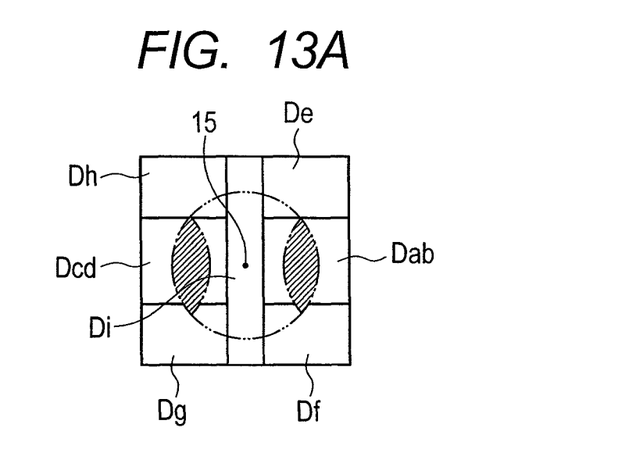
FIGS. 13A and 13B are views for showing other diffraction grating according to the present invention, in the embodiment 4.
Figure 13B:
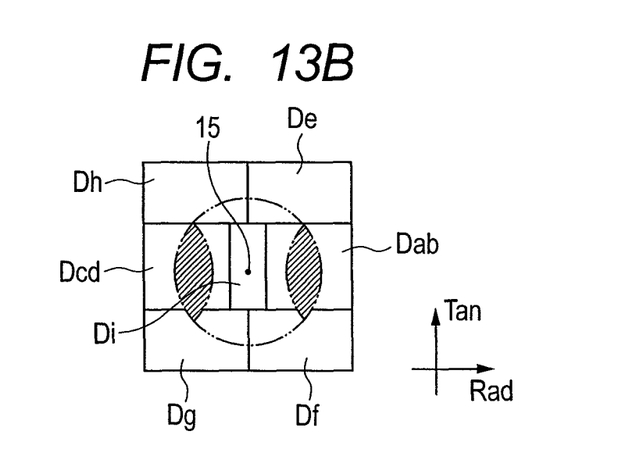

As was mentioned above, when diffracting the light beams entering into at least four (4) regions divided by dividing lines, passing through a center of the diffraction grating nearly in the Tan direction and the Rad direction, but not including the dividing line nearly in the Rad direction, nearly into the Tan direction, and when aligning them nearly into the Rad direction on the photo detector; the light receiving parts, for either one diffraction light, such as, the +1$^{st}$ dimensional diffraction light or the −1$^{st}$ dimensional diffraction light, are aligned nearly on a straight line, nearly in the Rad direction, while shifting the light receiving parts of the diffraction grating for the other diffraction light in the Tan direction, and thereby it is possible to divide the signal lights and the stray lights, effectively, even when reducing the optical magnification to be small. With this, it is possible to detect stable servo-signals, even if reducing the optical magnification to be small, and small-sizing the optical pickup device. However, in the present embodiment, the diffraction grating 11, although explanation was given by referring to FIG. 12, can obtain the similar effects, even if it is in a pattern shown in FIGS. 13A and 13B. Further, although the diffraction grating is disposed after passing through the beam splitter, according to the present embodiment; however the similar effects can be obtained if replacing the diffraction grating 11 by a polarization diffraction grating, and disposing it before passing through the beam splitter. Also, with spherical aberration compensation, there is no restriction. Also, according to the present embodiment, the diffraction light in the region Di of the diffraction grating is detected on the light receiving parts i1 and i2; however the present invention should not be limited to this, it may be detected on a light receiving surface on one side. And, according to the present embodiment, the light receiving parts ab1, cd1, re, se, tg, ug, tf, uf, rh and sh for the +1$^{st}$ dimensional diffraction light are aligned in the shape of "T", while the light receiving parts ab2, cd2, e2, f2, g2 and h2 for the −1$^{st}$ dimensional diffraction light are aligned in the shape of "Y"; however, not limited to this, for example, the light receiving parts for the −1$^{st}$ dimensional diffraction light may be disposed in the shape of "T" by replacing the light signals on the light receiving parts neighboring with, while disposing the light receiving parts for the +1$^{st}$ dimensional diffraction light in the shape of "Y". Also, the similar effects can be obtained even if it is the diffraction light of other dimension.

Embodiment 5

Figure 14:
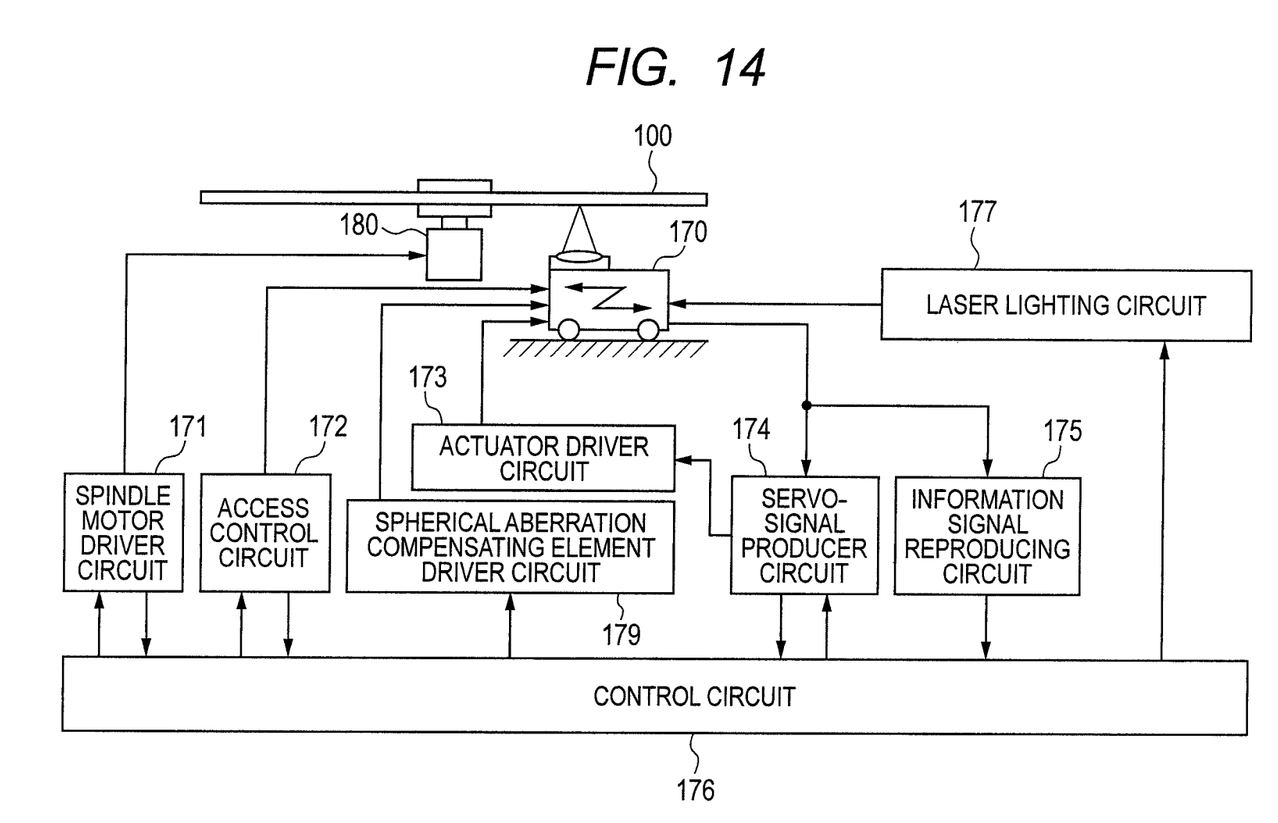
FIG. 14 is a view for explaining an optical reproducing apparatus according to an embodiment 5.

With an embodiment 5, explanation will be given on an optical recording apparatus, which mounts the optical pickup device 170 thereon. FIG. 14 shows an outline structure of the optical recording apparatus. On the optical pickup device 170 is provided a mechanism to be driven along the Rad direction of an optical disc 100, and the position of which is controlled depending on an access control signal from an access controller circuit 172.

From a laser lighting circuit 177, a predetermined laser dive current is supplied to a laser diode within the optical pickup device 170, and from the laser diode is emitted a laser light of a predetermined light amount or volume thereof, depending on reproduction. Further, the laser lighting circuit 177 can be installed within the optical pickup device 170.

A signal outputted from the photo detector 10 within the optical pickup device 170 is transmitted to a servo signal producer circuit 174 and an information signal reproducing circuit 175. In the servo signal producer circuit 174 are produced servo signals, such as, the focus error signal, the tracking error signal and a tilt control signal, etc., for example, upon basis of signals from the photo detector 10, and upon basis of this, position control of the objective lens is executed with driving an actuator(s) within the optical pickup device 170 through an actuator driver circuit 173.

In the information signal reproducing circuit 175 mentioned above, an information signal recorded on the optical disc 100 is reproduced upon basis of the signals from the optical detector 10 mentioned above.

A part of the signals obtained in the servo signal producer circuit 174 and the information signal reproducing circuit 175 mentioned above are transmitted to a control circuit 176. With this control circuits are connected a spindle motor driver circuit 171, an access controller circuit 172, the servo signal producer circuit 174, the servo signal producer circuit 174, a spherical aberration compensation element driver circuit 179, etc., and thereby conducting a rotation control of a spindle motor 180 for rotating the optical disc 100, a control on access direction and access position, a servo-control of the objective lens, a control of an amount of light emitted from the laser diode, compensation of the spherical aberration due to the difference in thickness of a disc substrate, etc.

Embodiment 6

Figure 15:
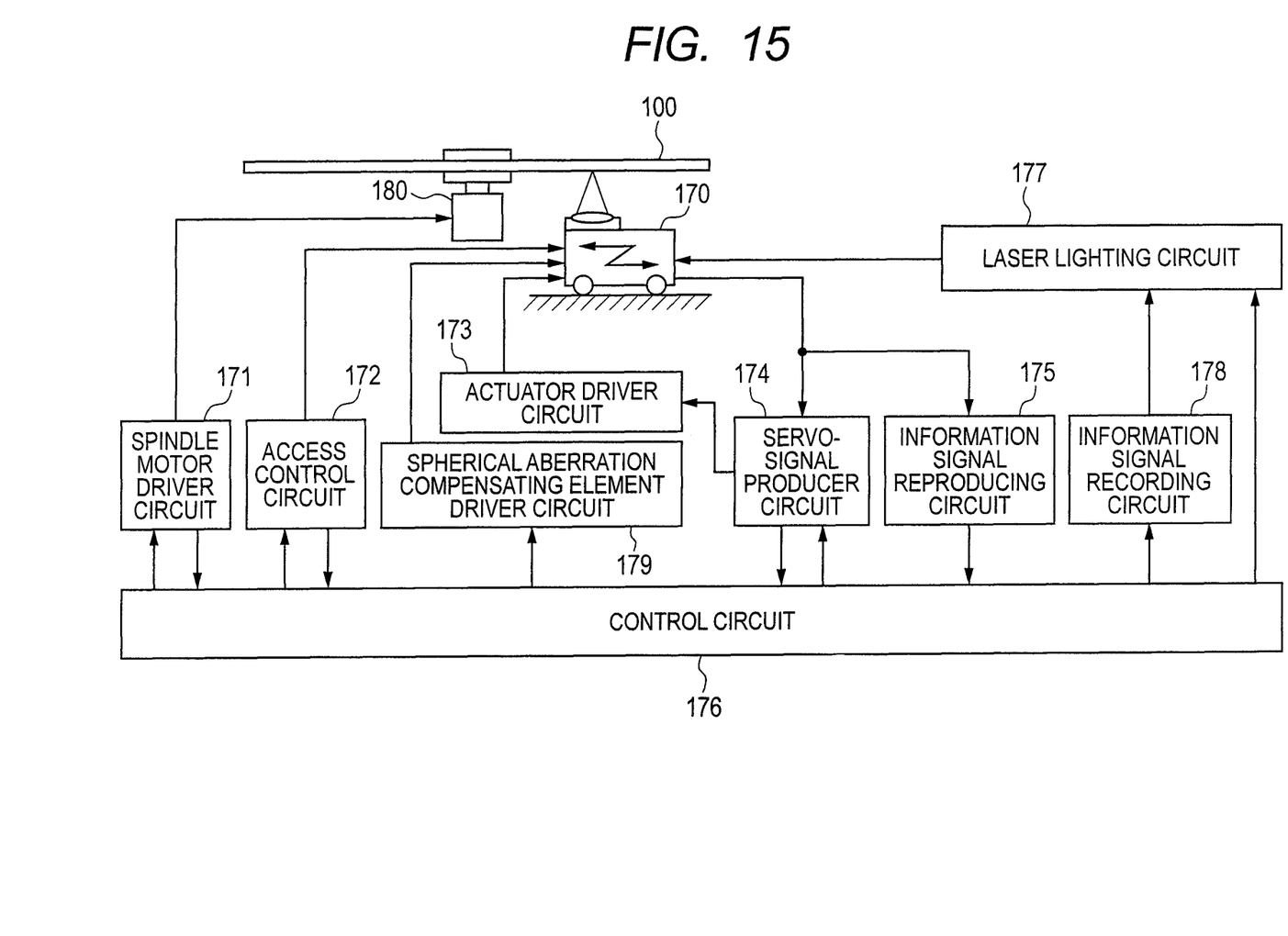
FIG. 15 is a view for explaining an optical recording/reproducing apparatus according to an embodiment 6.

With an embodiment 6, explanation will be given on an optical recording/reproducing apparatus, mounting the optical pickup device thereon. FIG. 15 shows an outline structure of the optical recording/reproducing apparatus. An aspect of this apparatus differing from the optical information reproducing apparatus explained by referring to FIG. 14 lies in that there are provided an information signal recording circuit 178 between the control circuit 176 and the laser lighting circuit 177, and upon basis of a recording control signal from the information signal recording circuit 178, the lighting control of the laser lighting circuit 177 is executed.

However, the present invention should not be restricted to the embodiments mentioned above, but various embodiments may be included therein. For example, the embodiments mentioned above are mentioned in details thereof, for the purpose of easy understanding of the present invention; but the present invention should not be limited, necessarily, only to that including all of the constituent elements, which are explained in the above. Also, it is possible to replace a part(s) of the constituent elements of a certain embodiment by a constituent element(s) of other embodiment, or to add a constituent element(s) of other embodiment to the constituent elements of a certain embodiment. Also, with a part of the constituent elements of each embodiment, it can be added, deleted and/or replaced by that of other embodiment(s).

What is claimed is:

1. An optical pickup device comprising:
a laser diode, which emits a laser light therefrom;
an objective lens, which is configured to irradiate the light beam emitting from said laser diode upon an optical disc;
a diffraction grating, which is configured to divide the light beam reflecting on an optical disc; and
a photo detector including plural numbers of at least a first light receiving region and a second light receiving region, which are configured to detect the light beams divided by said diffraction grating, wherein
the first and second light receiving regions include a plurality of light receiving parts, respectively,
said diffraction grating is divided, by a division line nearly coincident with a tangential direction of said optical disc, passing through a center of said diffraction grating, and a division line nearly coincident with a radial direction of said optical disc,
into at least four (4) grating regions, not including therein the division line nearly coincident with the radial direction of said optical disc,
the first and second light receiving regions detect either one, a $+1^{st}$ dimensional grating diffraction light or a $-1^{st}$ dimensional grating diffraction light of the light beam entering into at least the four (4) grating regions, not including the division line nearly coincident with the radial direction of said optical disc are aligned,
the plurality of light receiving parts of the first light receiving region are aligned nearly on a straight line in a direction nearly coincident with the radial direction of said optical disc,
the plurality of light receiving parts of the second light receiving region for detecting the other dimensional grating diffraction light are aligned, with shifting with respect to a direction nearly coincident with the tangential direction of said optical disc, and
a line connecting the plurality of the light receiving parts of the second light receiving region is on a line approaching to be vertical with respect to a direction into which the light beam on the light receiving parts fade away.

2. The optical pickup device, as described in the claim 1, wherein
a straight line connecting the plurality of light receiving parts of the first light receiving region are aligned nearly on a straight line in the direction nearly coincident with the radial direction of said optical disc is separated,
by a predetermined distance with respect to a center of said photo detector.

3. The optical pickup device, as described in the claim 1, wherein
at least two (2) grating regions are point-symmetric with respect to around a center of said diffraction grating, among at least four (4) grating regions, not including the division line nearly coincident with the radial direction of said optical disc, and
the plurality of the light receiving parts of light receiving regions for detecting diffraction lights in at least two (2) grating regions, which are point-symmetric with respect to said diffraction grating, are adjacent with each other.

4. The optical pickup device, as described in the claim 3, wherein
a straight line connecting the plurality of the light receiving parts of light receiving regions for detecting either one grating diffraction light, the $+1^{st}$ dimensional grating diffraction light or the $-1^{st}$ dimensional grating diffraction light of at least two (2) grating regions, which are point-symmetric with respect to around a center of said diffraction grating is, nearly,
coincide with the radial direction of said optical disc, and
a straight line connecting the plurality of the light receiving parts of light receiving regions for detecting the other dimensional grating diffraction light is,
on a line most approaching to be vertical with respect to a direction, into which the light beam on the light receiving parts fade away.

5. The optical pickup device, as described in the claim 1, wherein
at least a focus error signal and a tracking error signal are produced,
from signals detecting the $+1^{st}$ dimensional grating diffraction light or the $-1^{st}$ dimensional grating diffraction light of said diffraction grating.

6. An optical disc apparatus, comprising:
the optical pickup device described in the claim 1;
a laser lighting circuit, which is configured to drive said laser diode within said optical pickup device;
a servo-signal producing circuit, which is configured to produce a focus error signal and a tracking error signal with using signals detected by said photo detector within said optical pickup device; and
an information signal reproducing circuit, which is configured to reproduce an information signal recorded on said optical disc.

7. An optical pickup device, comprising:
a laser diode, which emits a laser light therefrom;
an objective lens, which is configured to irradiate the light beam emitting from said laser diode upon an optical disc;
a diffraction grating, which is configured to divide the light beam reflecting on an optical disc; and
a photo detector including plural numbers of at least a first light receiving region and a second light receiving region, which are configured to detect the light beams divided by said diffraction grating, wherein
the first and second light receiving regions include a plurality of light receiving parts, respectively,
said diffraction grating has three (3) regions, a region A, a region B and a region C,
among disc diffraction lights diffracted by a track on said optical disc,
a $0^{th}$ dimensional disc diffraction light enters into said region A,
the $0^{th}$ and $\pm 1^{st}$ dimensional disc diffraction lights enter into said region B,
on the first and the second light receiving regions of said photo detector, reproduction signals are detected from grating diffraction lights diffracting on said regions A, B and C, and also,
at least four (4) light receiving parts of the plurality of the light receiving parts of the first light receiving region for detecting either one grating diffraction light, a $+1^{st}$ dimensional grating diffraction light or a $-1^{st}$ dimensional grating diffraction light of said diffraction grating region A are aligned,
nearly, on a straight line in a direction nearly coincident with a radial direction of said optical disc,
the plurality of light receiving parts of the second light receiving region for detecting the other dimensional grating diffraction light are aligned, with shifting with respect to a direction nearly coincident with the tangential direction of said optical disc, and
a line connecting the plurality of the light receiving parts of the second light receiving region is on a line approaching to be vertical with respect to a direction into which the light beam on the light receiving parts fade away.

8. The optical pickup device, as described in the claim 7, wherein
at least two (2) light receiving parts of the plurality of the light receiving parts of the first light receiving region for detecting the $+1^{st}$ dimensional grating diffraction light or the $-1^{st}$ dimensional grating diffraction light or the $\pm 1^{st}$ dimensional disc diffraction lights of said diffraction grating region B are aligned,
nearly, on a straight line in the direction nearly coincident with the tangential direction of said optical disc.

9. The optical pickup device, as described in the claim 7, wherein
at least a focus error signal and a tracking error signal are produced,
from signals detecting the $+1^{st}$ dimensional grating diffraction light or the $-1^{st}$ dimensional grating diffraction light of said diffraction grating.

* * * * *